(12) United States Patent
Kothari (10) Patent No.: US 12,265,499 B2
(45) Date of Patent: Apr. 1, 2025

(54) METHOD FOR MIGRATING A CUSTOMER COMMUNICATION DOCUMENT BETWEEN CUSTOMER COMMUNICATION MANAGEMENT PLATFORMS

(71) Applicant: BULL SAS, Les Clayes-sous-bois (FR)

(72) Inventor: Mitesh Vikram Kothari, Mumbai (IN)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 18/585,955

(22) Filed: Feb. 23, 2024

(65) Prior Publication Data
US 2024/0289299 A1    Aug. 29, 2024

(30) Foreign Application Priority Data
Feb. 24, 2023  (EP) ................................. 23305252

(51) Int. Cl.
  *G06F 16/11*  (2019.01)
(52) U.S. Cl.
  CPC .................. *G06F 16/119* (2019.01)
(58) Field of Classification Search
  CPC ..................................................... G06F 16/119
  USPC ........................................................ 707/809
  See application file for complete search history.

(56) References Cited

U.S. PATENT DOCUMENTS

| 2022/0065741 | A1* | 3/2022 | Endo ................. G01M 11/0285 |
| 2024/0202630 | A1* | 6/2024 | Nakano ............. G06Q 10/0633 |
| 2024/0282092 | A1* | 8/2024 | Jayaraman ....... G06V 30/19173 |
| 2024/0289299 | A1* | 8/2024 | Kothari ................. G06F 16/119 |
| 2024/0338935 | A1* | 10/2024 | Pedone ..................... G06T 5/00 |
| 2024/0363211 | A1* | 10/2024 | Kothari .................. G16H 50/30 |
| 2024/0385603 | A1* | 11/2024 | Delautier ......... G05B 19/41875 |

FOREIGN PATENT DOCUMENTS

WO    2022009037 A1    1/2022

OTHER PUBLICATIONS

European Search Report and Written Opinion issued in EP23305252.1 dated Aug. 2, 2023 (12 pages).

* cited by examiner

*Primary Examiner* — Joshua Bullock
(74) *Attorney, Agent, or Firm* — ARC IP Law, PC; Joseph J. Mayo (57) ABSTRACT

The invention relates to a method for migrating a customer communication document from a first customer communication management platform to a second customer communication management platform. The method automates or at least semi-automates the migration of documents between customer communication management platforms by automating the generation of an intermediate document. The method automatically detects the dynamic information and the static information displayed on a set of documents, which is a crucial point to generate the intermediate documents.

10 Claims, 4 Drawing Sheets

METHOD FOR MIGRATING A CUSTOMER COMMUNICATION DOCUMENT BETWEEN CUSTOMER COMMUNICATION MANAGEMENT PLATFORMS

This application claims priority to European Patent Application Number 23305252.1, filed 24 Feb. 2023, the specification of which is hereby incorporated herein by reference.

BACKGROUND OF THE INVENTION

Field of the Invention

At least one embodiment of the invention related to customer communication management.

At least one embodiment of the invention regards a computer implemented method for migrating a customer communication document from a first customer communication management platform to a second customer communication management platform.

Description of the Related Art

A lot of organizations, for example in the telecom, utilities, financial service, and insurance industries, are in verge of transforming their existing communication modes. Especially after the COVID-19 crisis, there is an interest to digitalize these communications.

These organizations are communicating with their customers in various formats. Millions of documents, also called contents and/or forms, are generated from thousands of pre-defined templates.

These communications are created, delivered and stored with a customer communication management (CCM) platform. A CCM platform allows an organization to create, generate, and deliver many different types of customer communication documents via all possible electronic and traditional mediums using just one single platform. A customer communication document is a document comprising personalized information. These personalized information, also called dynamic information, are generated by dynamic data. A dynamic data is a data which continually changes after it has been stored in order to maintain its integrity. These dynamic data may be stored in a CRM database, which stands for customer relationship management database. A CRM database is a resource containing all client information collected, governed, transformed, and shared across an organization. An ERP, which stands for Enterprise resource planning, system may also be used to generate dynamic information for example by using dunning. Dunning is the process of methodically communicating with customers to ensure the collection of accounts receivable. A customer communication document also comprises generic information, also called static information, which are based on static data. These personalized and generic information are displayed in a document with various graphical user interfaces organized in a layout. A typical customer communication document contains various data such as payload data, static images, static content, tables and graphs. Payload data are displayed on the individual forms as dynamic information such as individual name, address, etc. . . . Static images are for example the header, footer and/or logo of the document. Static content is for example general rules and conditions text of the document. Tables are used to provide transactional details of the document. Graphs are used to provide transactional information on graphical format of the document.

Each organization have, generally 10000 to 20000 of customer communication documents to be migrated. Millions of output and communications are generated monthly, quarterly and yearly, and the process of migrating the documents can take 2 to 3 years.

As part of customer communication management and content intelligent solutions it is important to provide consistent output and integrity. There is also a need of systems not only for building the communications but also to perform semi-automation during migration of document.

Within this context, there is still a need to improve the migration of documents between CCM platforms.

BRIEF SUMMARY OF THE INVENTION

There is therefore a need to provide a method which automate or at least semi-automate the migration of documents between CCM platforms by automating the generation of an intermediate document. Notably, at least one embodiment of the invention automatically detects the dynamic information and the static information displayed on a set of documents, which is a crucial point to generate the intermediate documents.

According to at least one embodiment of the invention, this need is satisfied by providing a computer implemented method for migrating a customer communication document from a first customer communication management platform to a second customer communication management platform, the method comprising:

Obtaining a set of customer communication documents compatible with the first customer communication management platform, each customer communication document of the set of customer communication documents comprising a layout of information, the information being either static information or dynamic information, Obtaining a set of payload files, each payload file of the set of payload files comprising dynamic data, the dynamic data being the data used to generate the dynamic information of the customer communication documents, Extracting the information from the set of customer communication documents, Identifying a set of coordinates of the layout of information, each coordinate of the set of coordinates being the coordinate of an information of the layout of information, Converting the extracted information into data and storing the data in one or more intermediate files, Dividing the extracted information into a first group of static information and a second group of dynamic information by using the payload files and the data stored in the one or more intermediate files, Creating reference links to the data stored in the one or more intermediate files, each reference link being associated to one coordinate of the set of layout coordinates, Generating an information exchange formatter, the information exchange formatter comprising the data converted from the extracted information and/or the reference links and the layout coordinates, and Storing the one or more intermediate files and the information exchange formatter configured for being used as inputs by a connector to generate the customer communication document compatible with the second customer communication management platform.

The method according to at least one embodiment of the invention may also have one or more of the following characteristics, considered individually or according to any technically possible combinations thereof:
the extracted information are:
Tables, and/or
Static and dynamic text, and/or
Images, and/or
Optical mark recognition and Quick response data, and/or
Layout coordinates.
The method, in one or more embodiments, further comprises one or more steps among:
Displaying a canvas, the canvas being generated by using the one or more intermediate files and the information exchange formatter, the canvas comprising a layout of one or more graphical user interfaces, each graphical user interface comprising an information from the extracted information,
Obtaining one or more modifications of the layout of the canvas,
Modifying the one or more intermediate files and/or the information exchange formatter based on the one or more obtained modifications,
Storing the modified one or more intermediate files and the modified information exchange formatter, and
generating a target file compatible with the second customer communication management platform.
the step of displaying a canvas is performed with a single-page application.
the layout of the displayed canvas is generated by machine learning.
the step of extracting the information from the set of communication documents and the identifying a set of coordinates of the layout of information is performed by computer vision.

At least one embodiment of the invention includes a computer program comprising instructions which, when the computer program is carried out on a computer, cause the computer to carry out the method.

At least one embodiment of the invention includes a computer readable data storage medium having recorded thereon the computer program.

At least one embodiment of the invention includes a system comprising a processor coupled to a memory, the memory having recorded thereon the computer program.

BRIEF DESCRIPTION OF THE DRAWINGS

The figures are presented for information purposes only and in no way limit the one or more embodiments of the invention.

DETAILED DESCRIPTION OF THE INVENTION

For greater clarity, identical or similar elements are marked by identical reference signs in all of the figures.

Some embodiments of devices and methods in accordance with one or more embodiments of the invention are now described, by way of example only, and with reference to the accompanying drawings. The description is to be regarded as illustrative in nature and not as restrictive.

It is provided a method 1 for migrating a customer communication document from a first customer communication management platform to a second customer communication management platform, according to one or more embodiments of the invention. Migrating a document is the process of transferring data between data storage systems, data formats or computer systems. In the context of at least one embodiment of the invention, the migration is more specifically the transfer of data between two CCM platforms, the two CCM platforms being different CCM platforms.

The method is "computer implemented", according to one or more embodiments of the invention. "Computer-implemented" means that the steps, or at least some of the steps, are performed by at least one computer or processor or other similar system. Thus, in one or more embodiments, steps are performed by the computer, possibly fully automatically, or, semi-automatically. In examples, the triggering of at least some of the steps of these methods may be performed by user-computer interaction. The level of user-computer interaction required may depend on the level of automation intended and balanced against the need to implement the user's wishes. In examples, this level may be user defined and/or may be predefined.

A typical example of a computer implementation of a method is to execute the method with a system adapted for the purpose. A system may be configured to implement all the steps of the method and/or its various embodiments according to one or more embodiments of the invention. To this end, in at least one embodiment, the system comprises a memory and a computing unit, the memory being configured to store instructions which, when executed by the computing unit, cause the computing unit to implement the steps of the method according to one or more embodiments of the invention and/or the different embodiments of the method according to one or more embodiments of the invention. The system further comprises at least one network interface for communicating with remote entities, i.e. for sending and receiving data to said entities, via at least one network, according to one or more embodiments of the invention. The entities may be servers or computers storing data. The data may be stored by the same server or by different servers/databases.

The computer program may comprise instructions executable by a computer, the instructions comprising means for causing the above system to perform the methods according to one or more embodiments of the invention. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the methods by operating on input data and generating output, according to one or more embodiments of the invention. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, in at least one embodiment, the language may be a compiled or interpreted language. The program may be a full installation program or an update program. Application of the program on the system results in any case in instructions for performing the methods, according to one or more embodiments of the invention.

Figure 1:
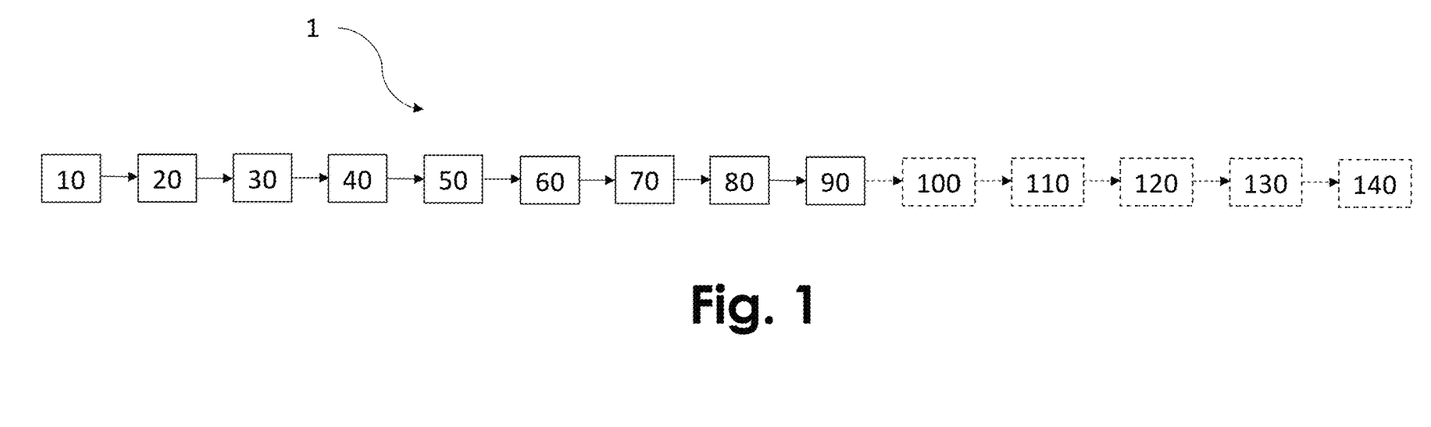
FIG. 1 shows a flowchart of a computer-implemented process integrating an example of the method according to one or more embodiments of the invention.

FIG. 1 is a synoptic scheme illustrating the steps of an example of the method 1 according to one or more embodiments of the invention. The mandatory steps of the example of the method 1 are indicated by a rectangle with solid lines and the optional steps are indicated by a rectangle with dashed lines.

Figure 2:
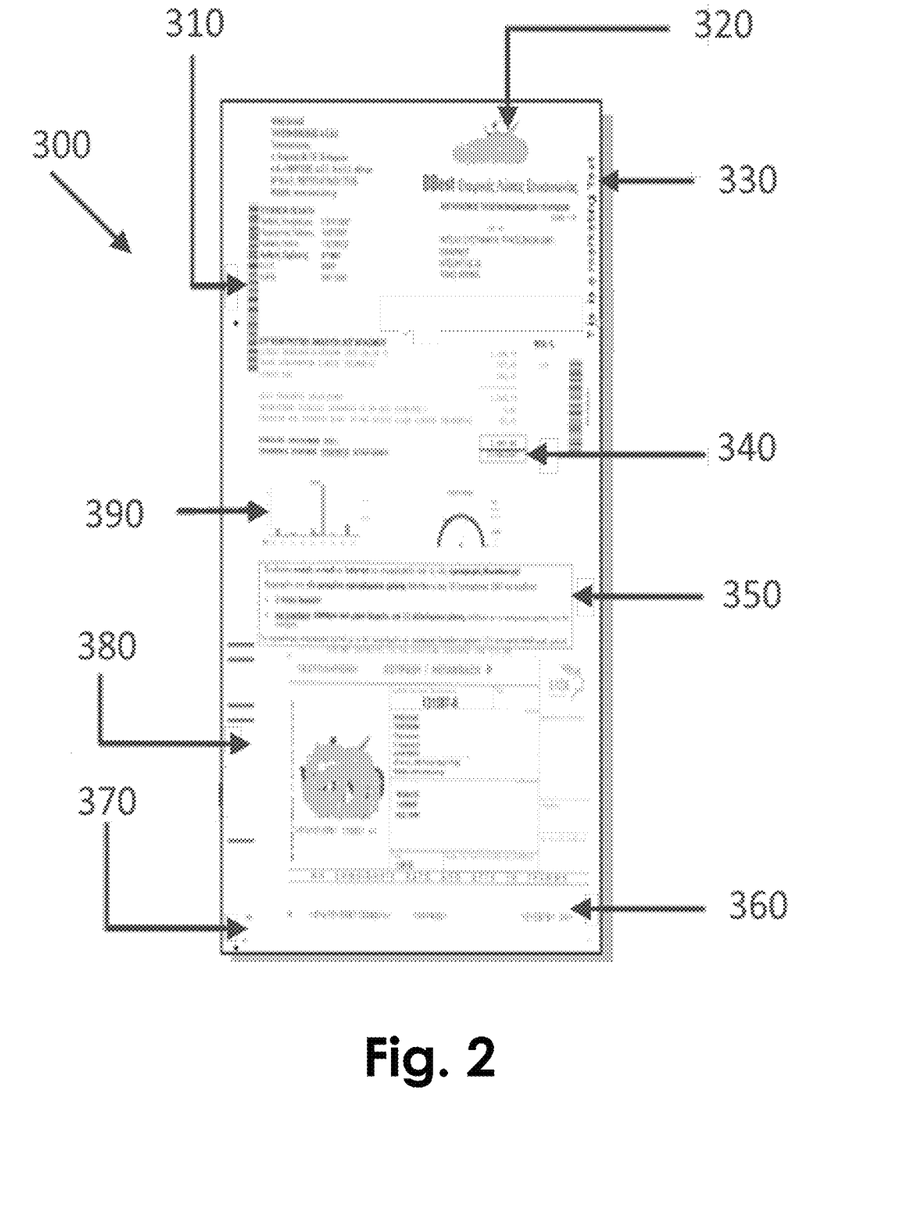
FIG. 2 shows an example of customer communication document according to one or more embodiments of the invention.

A first step 10 consists of obtaining a set of customer communication documents. A customer communication document comprises a layout of information, the information being either static information or dynamic information. A layout is the way in which the information are arranged or laid out. Each information is arranged in a layout based on layout coordinate. The layout coordinate of an information indicates a vertical and a horizontal position at which the information will be displayed in the layout. The set of customer communication documents may comprise customer communication documents generated from one or more CCM platforms. at least one embodiment, the set of customer communication documents comprises a number of customer communication documents between 50 and 500, preferably between 100 and 125. The customer communication documents obtained may be in various formats such as PDF, which stands for Portable Document Format, and/or HTML, which stands for Hypertext Markup Language, and/or Print stream. The term "obtaining" may be defined in the present application as "receiving by the system" or "providing". An example of customer communication document 300 is shown in FIG. 2, according to one or more embodiments of the invention. The example of customer communication document 300 comprises a customer bar code 310, an imported image 320, a vertical text 330, a custom calculation 340, a prioritized message 350, an algorithm 360, a global counter 370, a customized optical mark recognition information 380 and a data driven chart 390. The imported image 320 is here an example of a static information and the prioritized message 350 is an example of dynamic information. It is worth noting that from the customer communication document, it is not possible to automatically identify whether an information is static or dynamic. In other words, in at least one embodiment, it is not possible to infer for example, based on the content of the information or its type, such as an image, a text or an optical mark recognition information, if the information is static or dynamic.

In a second step 20, a set of payload files is obtained. The set of payload files correspond to the payload files used to generate the set of customer communication documents obtained at the step 10. A payload file comprises the dynamic data used to generate the dynamic information of the customer communication documents. In the present application, a distinction is made between the data and the information. A data may be a numeric, a text or even a binary data which is stored on the system. An information is displayed on a document and is generated by using such data. The generation of an information may need a conversion of an unintelligible data to an intelligible information. A payload file may be obtained in various formats such as:

- a TXT, which stands for text, file, and/or
- a COBOL, which stands for Common Business Oriented Language, copybook, which is a selection of code that defines data structures, and/or
- an SAP, which stands for Systems, Applications & Products, Print format, and/or
- a Unix print format such as ASCII, which stands for American Standard Code for Information Interchange.

A third step 30 consists of extracting the information from the set of customer communication documents. The extraction of the information is the process of finding an information comprised in a customer communication document and identifying the content of the information. For example, in at least one embodiment, for the customer communication document shown in FIG. 2, nine information are found during the step 30. Furthermore, in at least one embodiment, the content of the information 330 is identified as a text containing "This is marketing text" during the step 30. The information may be extracted by using computer vision. Computer vision is an interdisciplinary field that deals with how computers can be made to gain high-level understanding from digital images. From the perspective of engineering, it seeks to automate tasks that the human visual system can do. Computer vision is concerned with the automatic extraction, analysis and understanding of useful information from a single image or a sequence of images. As an example, in at least one embodiment, the computer vision in the present application may be used to extract and identify the information displayed on the customer communication documents. The extracted information are for example graphs, text paragraphs, tables, images, etc. The computer vision in the present application may also be used to label the information, detect the colors, detect if the text is handwritten or machine printed.

In a fourth step 40, a set of coordinates of the layout of information is identified. Hence, the coordinate of each information displayed on the customer communication document is computed. In other words, in at least one embodiment, each information is located, and its layout coordinate is extracted at this step 40. This step may also be performed by computer vision for example to identify the position, size, and orientation of the information displayed on the customer communication documents.

As an example, the extracted information may be tables. The extracted information may also be static and dynamic text, images, optical mark recognition and Quick response data and/or layout coordinates.

In a fifth step 50, the extracted information are converted into data and the data are stored in one or more intermediate files. These intermediate files may be an XML, which stands for Extensible Markup Language, file and/or XSL which stands for Extensible Stylesheet Language, file. An XML file is a file for storing, transmitting, and reconstructing arbitrary data. XML files have structure but no format. Extensible Stylesheet Language (XSL) adds formatting to XML documents. XSL provides a way of displaying XML semantics. XSL can map XML elements into other formatting languages. In other words, an XSL file is a style sheet that can be used to transform XML files into other document types and to format the output. The XML and XSL files may be stored in a MongoDB Database. MongoDB is a source-available cross-platform document-oriented database program. As an alternative, the intermediate files may also comprise one or more JSON, which stands for JavaScript Object Notation, files which may also be stored in a database such as a MongoDB Database.

The sixth step 60 consists of dividing the extracted information into a first group of static information and a second group of dynamic information. This step is performed by using the payload files and the data stored in the one or more intermediate files. This step may be performed by comparing the dynamic information from the payload files and the information stored in the intermediate files. Indeed, in the payload files, only dynamic information is stored. By comparing the dynamic information from the payload files with the information stored in the intermediate files, it is possible to identify pairs of information, according to one or more embodiments of the invention. A pair of information comprises dynamic information from the payload files and its corresponding information stored in the intermediate files. Therefore, if a pair is identified, it is possible to assign the type "dynamic" to the information stored in the intermediate files. The other information, information which are not identified in a pair, stored in the intermediate files are therefore static information. Hence, according to one or more embodiments of the invention, the type is assigned to each information stored in the intermediate files at this step and the information are divided into two groups: a first group of static information and a second group of dynamic information.

In a seventh step 70, reference links to the data stored in the one or more intermediate files are created. A reference link is a link from one information object to another. Each reference link created during this step is a link towards a data stored in the one or more intermediate files. Furthermore, in at least one embodiment, each reference link is associated to one coordinate of the set of layout coordinates. The coordinate associated to one reference link is the coordinate of the information which was generated with the data linked by the reference link. In that way, with a reference link it is possible to retrieve the data used to generate one information and its coordinate. The reference links may be stored in one or more XML files.

The eighth step 80 consists of generating an information exchange formatter. The information exchange formatter is one or more file which contains all the data needed to create one or more customer communication documents compatible with one or more CCM platforms. The information exchange formatter comprises the data and/or the reference links and the layout coordinates. The information exchange formatter may comprise a link to the files containing the data and/or the reference links and the layout coordinates. The information exchange formatter may be obtained with an XSLT, which stands for XSL Transformation, processor taking as inputs the intermediate files, the reference links and the layout coordinates. An XSLT processor transforms XML documents into other forms of XML documents. An XSLT processor also takes as input XSLT code, which specifies how to transform the inputs into the information exchange formatter.

In a ninth step 90, the one or more intermediate files and the information exchange formatter are stored. These files may then be used as inputs by a connector to generate a customer communication file in a format supported by a target CCM platform. For example, in at least one embodiment, the one or more intermediate files and the information exchange formatter may be used by a connector to generate a Papyrus DocEXEC which is the formatting component of the Papyrus Platform. A connector is a tool such as a medium or a language which is specific to a target CCM platform. The connector can consume for example XML and XSL files to adapt the layout as per target platform. Furthermore, each target CCM platform has its own proprietary format in which the connector will convert the files provided as inputs.

Figure 3:
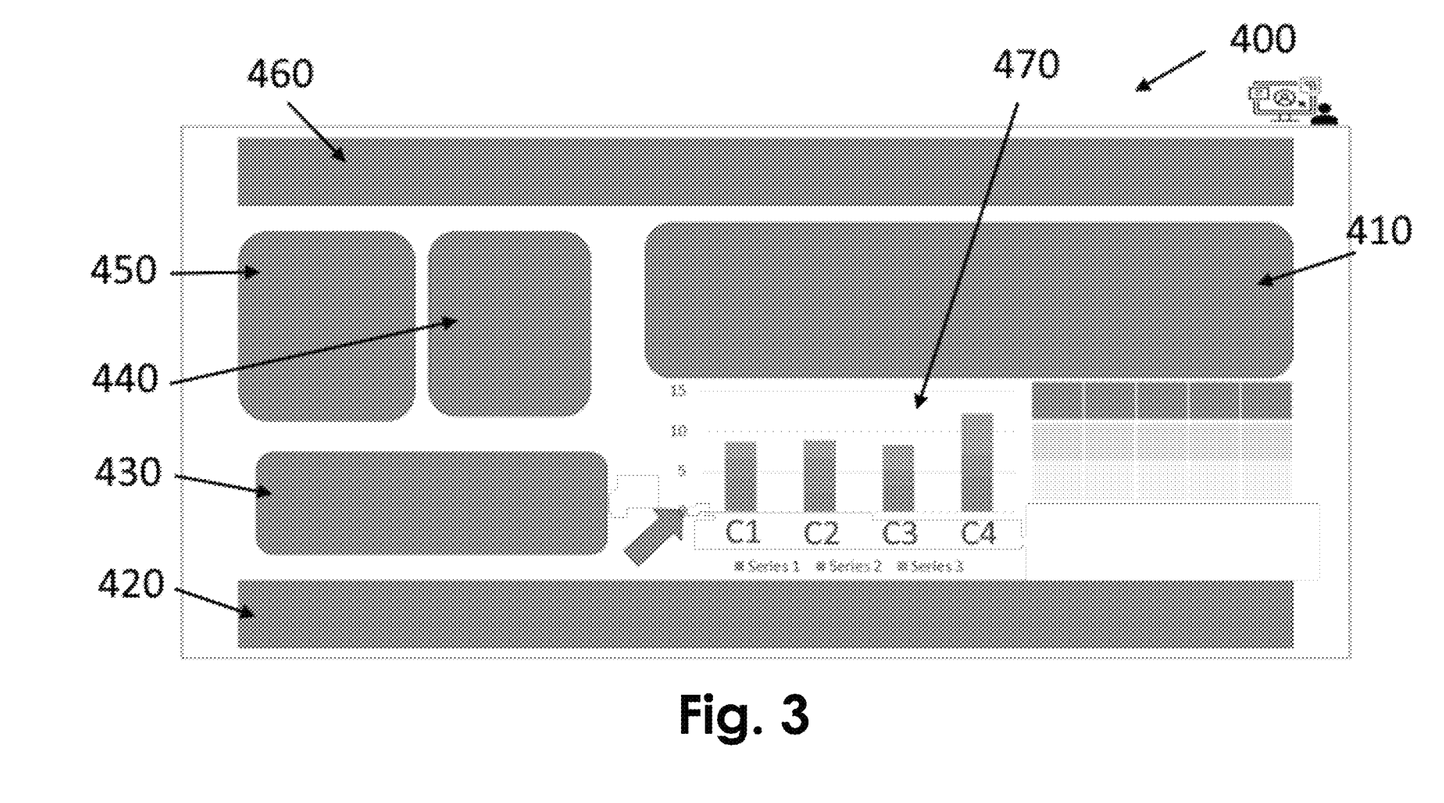
FIG. 3 shows an example of a canvas displayed on a single page application according to one or more embodiments of the invention.

At least one embodiment of the invention may comprise five additional steps 100, 110, 120, 130 and 140. The additional step 100 consists of displaying a canvas comprising a layout of one or more graphical user interfaces, each graphical user interface comprising an information from the extracted information. A canvas is a container which holds various elements and define their spatial representation and allow the user to interact with the elements via graphical user interfaces. The canvas is generated by using the intermediate files and the information exchange formatter. The canvas may be displayed with a single page application. FIG. 3 shows an example of a canvas 400 displayed with a single page application, according to one or more embodiments of the invention. The canvas 400 contains various information such as policy details 410, a footer 420, marketing campaign messages 430, an image 440, an address 450, a header 460 and a graph 470.

Figure 4:
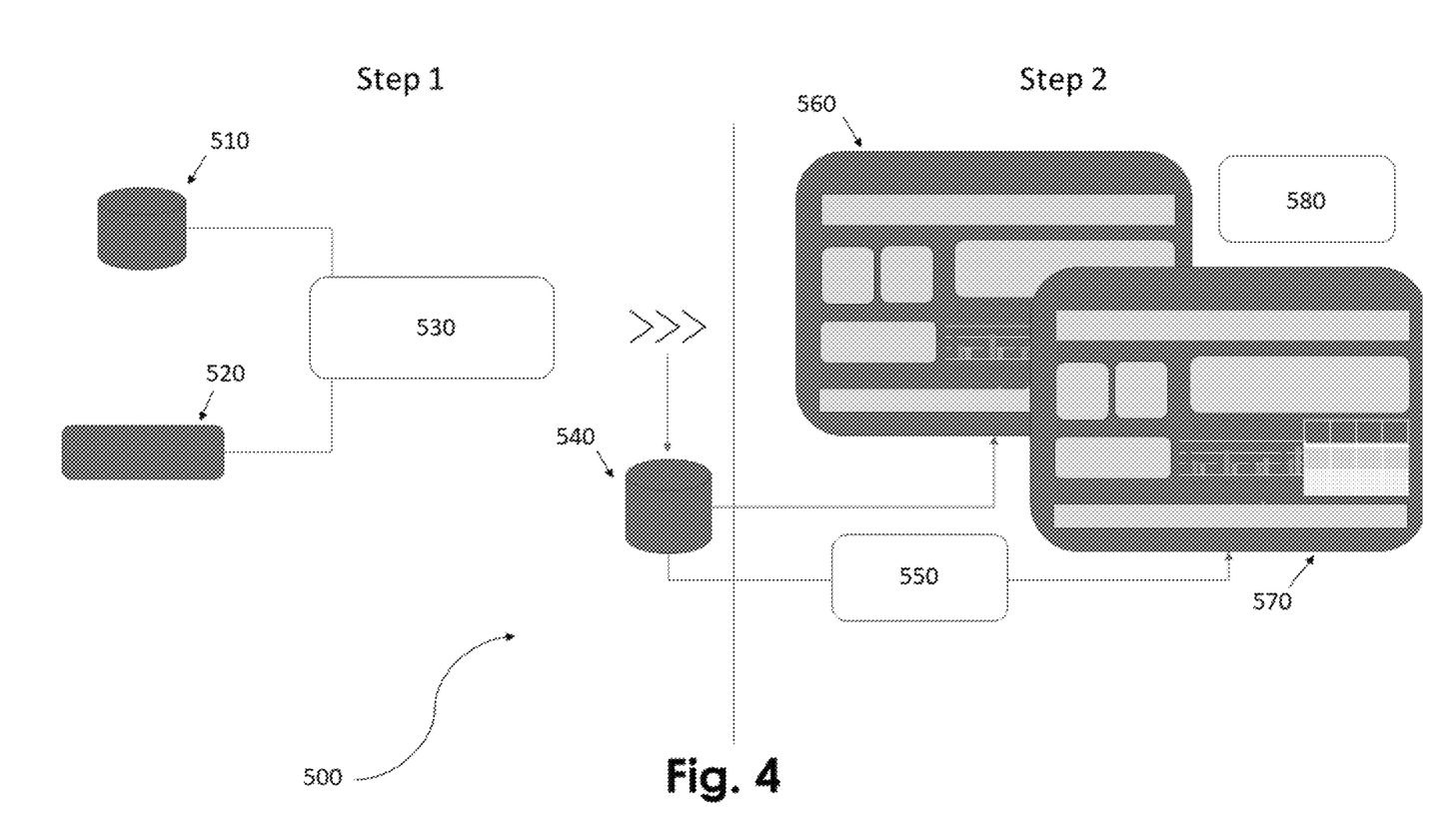
FIG. 4 shows an illustration of a recommendation engine compatible with the method according to one or more embodiments of the invention.

The layout of the canvas may be generated by machine learning. For example, a neural network, such as a convolutional neural network (CNN), may be trained to generate a layout and recommendation as well. The training of the neural network may be using training data comprising a set of information exchange formatters generated 80. The trained neural network may take as input information to display in a customer communication document and may generate as output a layout of the customer communication document such as the layout 560 or 570. The generated layout may be used in a recommendation engine. FIG. 4 shows an illustration of a recommendation engine 500 compatible with the method according to one or more embodiments of the invention. For example, a first step 530 of the recommendation engine may consist of drafting a first layout 560 by using an application programming interface (API). The API processing 530 uses as inputs the content stored on a database 510 such as a database-RDBMS and the extracted details 520. Then the first layout 560 obtained at the step 530 may be stored in a second database 540 such as a MongoDB database. A second step of the recommendation engine may consist of showcasing various other layouts 570, generated by the CNN in a step 550. Finally, the user may choose in a step 580 between the displayed layouts and/or edit one of the layouts 560 or 570.

In the additional step 110, one or more modifications of the layout of the canvas are obtained. For example, in at least one embodiment, the modifications may be a moving and/or a removing of one or more graphical user interfaces. These modifications may be done by a user directly by using the single page application.

The additional step 120 consists of modifying the one or more intermediate files and/or the information exchange formatter based on the one or more obtained modifications. For example, in at least one embodiment, if the modification obtained is a moving of one graphical user interface, the layout coordinate of the corresponding information is modified.

In the additional step 130, the modified one or more intermediate files and the modified information exchange formatter are stored. The modified one or more intermediate files and the modified information exchange formatter may replace the one or more intermediate files and the information exchange formatter used to generate the canvas at step 100.

In the additional step 140, a target file compatible with the second CCM platform is generated. The generation of the target file compatible with the second CCM platform may be performed by using a connector. In a first example, the one or more intermediate files and the information exchange formatter may be used as inputs. In a second example, the modified intermediate files and the modified information exchange formatter may be used as inputs.

The invention claimed is:

1. A computer implemented method for migrating a customer communication document from a first customer communication management platform to a second customer communication management platform, the computer implemented method comprising:
   obtaining a set of customer communication documents compatible with the first customer communication management platform, each customer communication document of the set of customer communication documents comprising a layout of information, the information being either static information or dynamic information,
   obtaining a set of payload files, each payload file of the set of payload files comprising dynamic data, the dynamic data being data used to generate the dynamic information of the set of customer communication documents,
   extracting the information from the set of customer communication documents,
   identifying a set of coordinates of the layout of information, each coordinate of the set of coordinates being a coordinate of an information of the layout of information,
   converting the information that is extracted into data and storing the data in one or more intermediate files,
   dividing the information that is extracted into a first group of static information and a second group of dynamic information by using the set of payload files and the data stored in the one or more intermediate files,
   creating reference links to the data stored in the one or more intermediate files, each reference link of the reference links being associated to one coordinate of the set of coordinates,
   generating an information exchange formatter, the information exchange formatter comprising the data that is converted from the information that is extracted, the reference links and the set of coordinates, and
   storing the one or more intermediate files and the information exchange formatter configured for being used as inputs by a connector to generate the each customer communication document compatible with the second customer communication management platform.

2. The computer implemented method of claim 1, wherein the information that is extracted comprises one or more of
   tables,
   static and dynamic text,
   images,
   optical mark recognition and Quick response data,
   layout coordinates.

3. The computer implemented method of claim 1, further comprising,
   displaying a canvas, the canvas being generated by using the one or more intermediate files and the information exchange formatter, the canvas comprising a layout of one or more graphical user interfaces, each graphical user interface of the one or more graphical user interfaces comprising an information from the information that is extracted,
   obtaining one or more modifications of the layout of the canvas,
   modifying one or more of
      the one or more intermediate files, and
      the information exchange formatter
      based on the one or more modifications that are obtained, and
   storing one or more of the one or more intermediate files that are modified and the information exchange formatter that is modified.

4. The computer implemented method of claim 3, wherein the displaying the canvas is performed with a single-page application.

5. The computer implemented method of claim 3, wherein the layout of the canvas that is displayed is generated by machine learning.

6. The computer implemented method of claim 1, wherein one or more of the extracting the information from the set of communication documents and the identifying the set of coordinates of the layout of information are performed by computer vision.

7. The computer implemented method of claim 1, further comprising generating a target file compatible with the second customer communication management platform.

8. A non-transitory computer program comprising instructions for performing a computer implemented method for migrating a customer communication document from a first customer communication management platform to a second customer communication management platform, the computer implemented method comprising:
   obtaining a set of customer communication documents compatible with the first customer communication management platform, each customer communication document of the set of customer communication documents comprising a layout of information, the information being either static information or dynamic information,
   obtaining a set of payload files, each payload file of the set of payload files comprising dynamic data, the dynamic data being data used to generate the dynamic information of the set of customer communication documents,
   extracting the information from the set of customer communication documents,
   identifying a set of coordinates of the layout of information, each coordinate of the set of coordinates being a coordinate of an information of the layout of information,
   converting the information that is extracted into data and storing the data in one or more intermediate files,
   dividing the information that is extracted into a first group of static information and a second group of dynamic information by using the set of payload files and the data stored in the one or more intermediate files,
   creating reference links to the data stored in the one or more intermediate files, each reference link of the reference links being associated to one coordinate of the set of coordinates,
   generating an information exchange formatter, the information exchange formatter comprising the data that is converted from the information that is extracted, the reference links and the set of coordinates, and
   storing the one or more intermediate files and the information exchange formatter configured for being used as inputs by a connector to generate the each customer communication document compatible with the second customer communication management platform.

9. The non-transitory computer program of claim 8, wherein the non-transitory computer program is stored on a non-transitory computer readable storage medium.

10. A system comprising:
a processor,
a memory, and
a display,
wherein the processor is coupled to the memory and the display,
wherein the memory having comprises a non-transitory computer program recorded thereon,
wherein the non-transitory computer program comprises instructions for performing a computer implemented method for migrating a customer communication document from a first customer communication management platform to a second customer communication management platform, the computer implemented method comprising
 obtaining a set of customer communication documents compatible with the first customer communication management platform, each customer communication document of the set of customer communication documents comprising a layout of information, the information being either static information or dynamic information,
 obtaining a set of payload files, each payload file of the set of payload files comprising dynamic data, the dynamic data being data used to generate the dynamic information of the set of customer communication documents,
 extracting the information from the set of customer communication documents,
 identifying a set of coordinates of the layout of information, each coordinate of the set of coordinates being a coordinate of an information of the layout of information,
 converting the information that is extracted into data and storing the data in one or more intermediate files,
 dividing the information that is extracted into a first group of static information and a second group of dynamic information by using the set of payload files and the data stored in the one or more intermediate files,
 creating reference links to the data stored in the one or more intermediate files, each reference link of the reference links being associated to one coordinate of the set of coordinates,
 generating an information exchange formatter, the information exchange formatter comprising the data that is converted from the information that is extracted, the reference links and the set of coordinates, and
 storing the one or more intermediate files and the information exchange formatter configured for being used as inputs by a connector to generate the each customer communication document compatible with the second customer communication management platform.

* * * * *